Patented Nov. 10, 1931

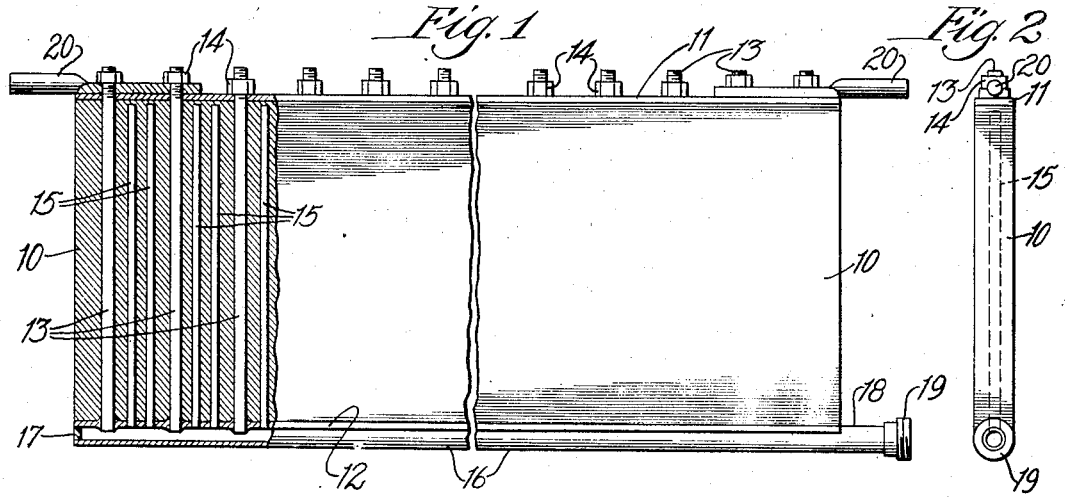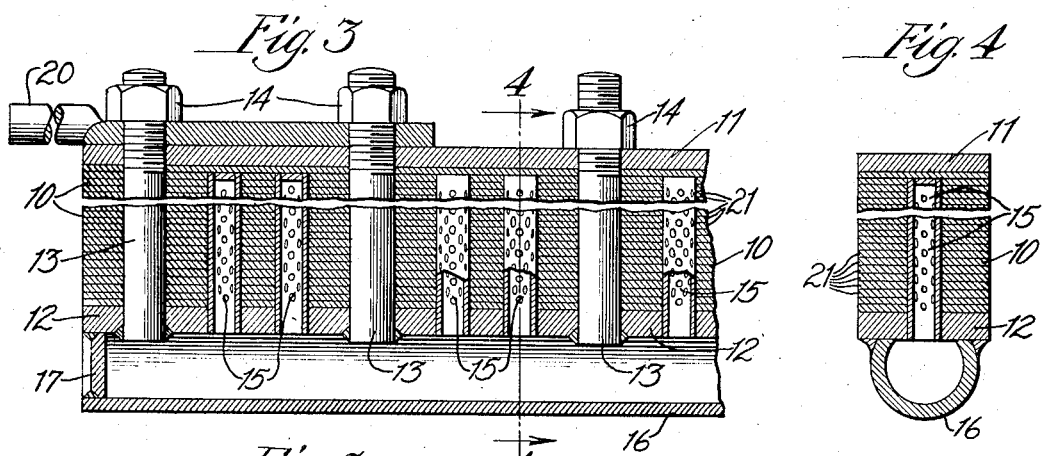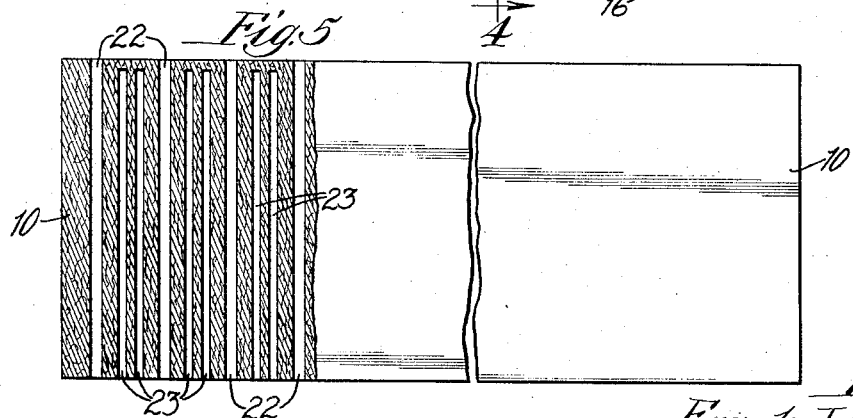

1,830,994

UNITED STATES PATENT OFFICE

FRANK J. GAINER, ELMER H. PAYNE, AND WILLIAM BACHELDOR, OF WOOD RIVER, ILLINOIS, ASSIGNORS TO STANDARD OIL COMPANY, OF WHITING, INDIANA, A CORPORATION OF INDIANA

FILTER PRESS LEAF

Application filed January 6, 1928. Serial No. 244,854.

This invention relates to leaves for filter presses and particularly to leaves which are used for filtering liquids at high temperatures.

The filter leaves are particularly suitable for use in the process of filtering petroleum pressure tar containing lime at high temperatures, as described and claimed in C. D. Reed's application, Serial No. 201,004, filed June 23, 1927.

The invention will readily be understood from the following description of a preferred embodiment, in conjunction with the accompanying drawings, in which—

Figure 1 is a side view of an assembled leaf;

Fig. 2 is an end view thereof;

Fig. 3 is a detail of the leaf in longitudinal section;

Fig. 4 is a sectional view on the line 4—4 of Fig. 3; and

Fig. 5 is an elevation, partly in section, of an integral block of filter medium.

Referring to the drawings, the filter leaf comprises a filter medium 10 constituted by a mass of asbestos. This filter medium is held under pressure between an upper pressure plate 11 and a lower pressure plate 12 by tie rods 13 which are embedded in said mass. The tie rods 13 are preferably attached, for example, by welding to the lower plate 12, and their upper ends may be screw-threaded for reception of nuts 14 for applying the pressure necessary to prevent leakage of unfiltered liquid into the interior of the filter leaf.

A plurality of perforated pipes 15 are also embedded in the mass of asbestos. These pipes are preferably closed at their upper ends and are attached at their lower open ends, preferably by welding, in openings in the lower plate 12. It is preferred that the pipes 15 do not contact with the upper pressure plate 11 and that filter medium extends between said plate and their upper ends to avoid the possibility of channelling of unfiltered liquid to the pipes 15.

Attached to the underside of the lower pressure plate 12, preferably by welding, is a trough 16. This trough 16 is preferably formed by cutting away part of a pipe in a plane parallel to its axis. One end of said trough is closed, as shown at 17. The other end leads to a pipe 18 which is provided with means, for example, a screw-threaded member 19, for attachment to a filtrate outlet on the filter press.

The filter leaf is provided with means for supporting it within the filter-press. Such means may be suitably attached at the ends of the upper pressure plate 11, as shown diagrammatically at 20.

As illustrated in Fig. 3, the mass of asbestos may be formed from a large number of strips of asbestos board 21, suitably perforated for the reception of the tie-rods 13 and perforated pipes 15. After a suitable number of asbestos strips have been applied to the plate 12 and the tie-rods 13 and perforated pipes 15, the plate 11 is placed in position and the asbestos compressed by the nuts 14 to such a degree that no channelling of the liquid is permitted either between the strips of asbestos or between the asbestos mass and the pressure plates 11 and 12. As shown in Figs. 3 and 4, it is preferred that the last strip of asbestos should be perforated only for the reception of the tie-rods 13 so that a layer of asbestos is provided above the upper ends of the pipes 15.

Instead of forming the asbestos mass 10 from strips of asbestos, it may be formed or moulded in an integral piece as shown in Fig. 5. Such integral mass is produced with transverse channels 22 for the reception of the rods 13 and channels 23 for the perforated pipes 15 which preferably do not extend completely through the formed mass. The formed mass is applied to the plate 12, the tie-rods 13 and pipes 15, the pressure plate 11 applied and the mass compressed by the nuts 14, as described in connection with modification previously described.

Although the present invention has been described in connection with the details of specific embodiments thereof, it is not intended that such details shall be regarded as limitations upon the scope of the invention, except in so far as included in the accompanying claims.

We claim:

1. A leaf for pressure filter-presses employed for the filtration of liquids maintained at high temperatures comprising a mass of asbestos, means for maintaining said mass under varying compression, means embedded in said mass and adapted to receive liquid filtering through said asbestos, and means for conducting away said liquid from said receiving means.

2. A leaf for pressure filter-presses employed for the filtration of liquids maintained at high temperatures comprising a filtering medium constituted by a molded mass of asbestos, a pair of pressure plates on opposite sides of said mass, tie-rods connecting said plates and adapted to apply compression upon said mass, perforated liquid conducting means within said mass and a liquid conduit communicating therewith.

3. A leaf for pressure filter-presses employed for the filtration of liquids maintained at high temperatures comprising a filtering medium constituted by a molded mass of asbestos, a pair of pressure plates on opposite sides of said mass, tie-rods embedded in said mass, connecting said plates and adapted to apply varying degrees of compression upon said mass, a plurality of perforated pipes embedded in said mass, and a liquid conduit communicating with said pipes.

4. A leaf for pressure filter-presses employed for the filtration of liquids maintained at high temperatures comprising a filtering medium constituted by a mass of asbestos, a pair of pressure plates on opposite sides of said mass, tie-rods embedded in said mass, connecting said plates and adapted to apply varying degrees of compression upon said mass, a plurality of perforated pipes attached to one of said plates and embedded in said mass, and a liquid conduit constituted by said plate and a trough-like member, said conduit communicating freely with said perforated pipes.

5. A leaf for pressure filter-presses employed for the filtration of liquids maintained at high temperatures comprising a filtering medium constituted by a mass of asbestos, a pair of pressure plates on opposite sides of said mass, tie-rods connecting said plates and adapted to apply compression upon said mass, perforated liquid conducting means within said mass and a liquid conduit communicating therewith.

6. A leaf for pressure filter-presses employed for the filtration of liquids maintained at high temperatures comprising a filtering medium constituted by a mass of asbestos, a pair of pressure plates on opposite sides of said mass, tie-rods embedded in said mass, connecting said plates and adapted to be adjusted to apply varying degrees of compression upon said mass, a plurality of perforated pipes embedded in said mass, and a liquid conduit communicating with said pipes.

FRANK J. GAINER.
ELMER H. PAYNE.
WILLIAM BACHELDOR.